Patented Dec. 7, 1926.

1,609,872

UNITED STATES PATENT OFFICE.

JAMES B. GARNER, ROLLA W. MILLER, AND GEORGE A. SHANER, OF PITTSBURGH, PENNSYLVANIA, ASSIGNORS TO STANDARD DEVELOPMENT COMPANY, A CORPORATION OF DELAWARE.

PROCESS OF PURIFYING GASES.

No Drawing.     Application filed December 30, 1922. Serial No. 610,035.

This invention relates to the art of purifying gas, and will be fully understood from the following description.

Gas containing sulfur compounds, cyanogen compounds, etc., is customarily purified by iron oxid, ilme or alkali, the gas being passed through the purifier agent until the activity thereof is too low for effective results. Such agents can be restored or revivified to an extent by aeration, but the capacity in such systems is not all that could be desired.

In accordance with the present invention, the gas to be purified is washed or scrubbed in any suitable apparatus with a liquid capable of taking up the sulfur compounds, cyanogen compounds, etc., for example a solution of sodium hydroxid, or other alkaline solution. The concentration will depend somewhat upon the amount of impurities carried by the gas, but in instances using sodium hydroxid on gases derived from coal, concentrations of 1–7% have been satisfactory. In addition the liquid contains an agent for altering, in particular lowering, the surface tension, for example a soluble soap ½ to 4%, or oleic acid or saponin or the like. Liquid is circulated through the scrubber one or more times as desired, preferably in countercurrent to the gas, and is then revivified, as for example by being passed through a mass of suitable metallic oxid, preferably ferric oxid, and then back to the gas scrubber and so on in continuous cycle. The ferric oxid may be used in substantial purity or in admixture with alumina, silica and organic matter as in the so-called hydrated iron oxid preparations to be had commercially. To revivify the iron oxid mass, it is exposed to air; preferably the container has connections by which air may be blown thoroughly through the mass periodically or continuously. In some cases, instead of using a stationary mass of ferric oxid through which the alkali is passed in cycle, finely divided iron oxids, or ferrous sulfate, or copper sulfate, or nickel sulfate, 1–10%, may be added to the alkali, the liquid then being cycled through the gas scrubber as many times as desired and then through an aerator where it is thoroughly exposed to or blown with air. If desired, instead of adding the sulfates of iron, or copper, or nickel to the alkali solution, the hydroxides may be added per se. In all cases, the purifier liquid is to contain in addition an agent altering, in particular lowering the surface tension. For example, ½ to 4% of soap may be added, or oleic acid or other fatty acid, or glue, or saponin, etc. The effect of such agent appears to be an increasing of the contact surfaces, or promoting of the filming tendency of the liquid, and where suspended solids are carried, a raising of the concentration of the reacting substances at the film surfaces of contact; but irrespective of what the precise mechanism may be, it is found that the addition of the agents named greatly increases the efficiency of transfer. In some instances, instead of using sodium hydroxid solution, other alkaline solutions may be used, for example potassium hydroxid, potassium carbonate, sodium carbonate, calcium hydroxid in suspension as milk of lime, etc., the agent altering the surface tension being added thereto. In the case of calcium hydroxid, oleic acid would be used, and in cases where ferrous sulfate is employed, saponin would be a preferable surface tension altering agent.

Thus, as seen, our invention contemplates in general where a liquid-carried purifier is used, the altering of the surface tension of the liquid to secure efficient contact.

While we have described our invention by reference to certain details, it will be understood that this is for the purpose of explanatory illustration, and is not limitative. Nor is the invention to be considered as dependent upon the accuracy of any theories advanced in attempted explanation of the advantageous results attained. On the contrary, the invention is to be regarded as limited only as defined in the following claims, in which it is our intention to claim all inherent novelty as broadly as the prior art permits.

What we claim is:—

1. The improvement in the art of removing sulfur compounds, cyanogen compounds, and other impurities from gases, which comprises treating a gas containing such impurities with a liquid-carried purifier in the presence of an agent promoting the filming tendency of the liquid.

2. The improvement in the art of removing sulfur compounds, cyanogen compounds, and other impurities from gases, which comprises treating a gas containing such impurities with a liquid-carried purifier in the presence of an agent to lower the surface tension.

3. The improvement in the art of removing sulfur compounds, cyanogen compounds, and other impurities from gases, which comprises treating a gas containing such impurities with a liquid-carried purifier in the presence of less than 4% of a soap.

4. The improvement in the art of removing sulfur compounds, cyanogen compounds, and other impurities from gases, which comprises treating a gas containing such impurities with a solution of less than 7% of a strong alkali in the presence of a surface-tension lowering agent.

5. The improvement in the art of removing sulfur compounds, cyanogen compounds, and other impurities from gases, which comprises treating a gas containing such impurities with a solution of less than 7% of a strong alkali and less than 4% of a soap.

6. The improvement in the art of removing sulfur compounds, cyanogen compounds, and other impurities from gases, which comprises treating a gas containing such impurities with a caustic soda solution containing less than 7% of caustic soda in the presence of an agent for lowering the surface tension.

7. The improvement in the art of removing sulfur compounds, cyanogen compounds, and other impurities from gases, which comprises treating a gas containing such impurities with a caustic soda solution in the presence of a soap.

8. The improvement in the art of removing sulfur compounds, cyanogen compounds, and other impurities from gases, which comprises treating a gas containing such impurities with a liquid-carried purifier in the presence of an agent altering the surface tension, and revivifying the solution.

9. The improvement in the art of removing sulfur compounds, cyanogen compounds, and other impurities from gases, which comprises treating a gas containing such impurities with a liquid-carried purifier in the presence of a soap, and revivifying the solution.

10. The improvement in the art of removing sulfur compounds, cyanogen compounds, and other impurities from gases, which comprises treating a gas containing such impurities with an alkaline solution in the presence of an agent lowering the surface tension, and revivifying the solution.

11. The improvement in the art of removing sulfur compounds, cyanogen compounds, and other impurities from gases, which comprises treating a gas containing such impurities with an alkaline solution in the presence of a soap, and revivifying the solution.

12. The improvement in the art of removing sulfur compounds, cyanogen compounds, and other impurities from gases, which comprises treating a gas containing such impurities with a caustic soda solution in the presence of an agent lowering the surface tension, and revivifying the solution.

13. The improvement in the art of removing sulfur compounds, cyanogen compounds, and other impurities from gases, which comprises treating a gas containing such impurities with a solution of caustic soda and a soap, and revivifying the solution.

14. The improvement in the art of purifying gases, which comprises treating the gas with an alkaline solution containing a surface tension lowering agent and contacting the solution with an oxygen-containing compound of a metal.

15. The improvement in the art of purifying gases, which comprises treating the gas with a solution of sodium hydroxid and a soap and contacting the solution with an oxygen-containing iron compound.

16. The improvement in the art of purifying gases, which comprises washing the gas with a solution containing 1 to 7% of sodium hydroxid and ½ to 4% of a soap, contacting the solution with an oxygen-containing iron compound, and aerating the iron compound.

JAMES B. GARNER.
ROLLA W. MILLER.
GEORGE A. SHANER.